(No Model.)
J. F. APPLEBY.
TWINE BOX FOR GRAIN BINDERS.
No. 290,658. Patented Dec. 25, 1883.
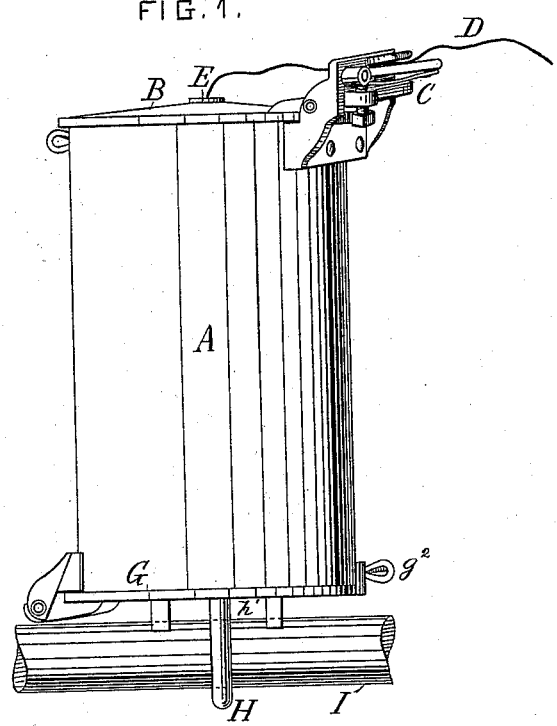
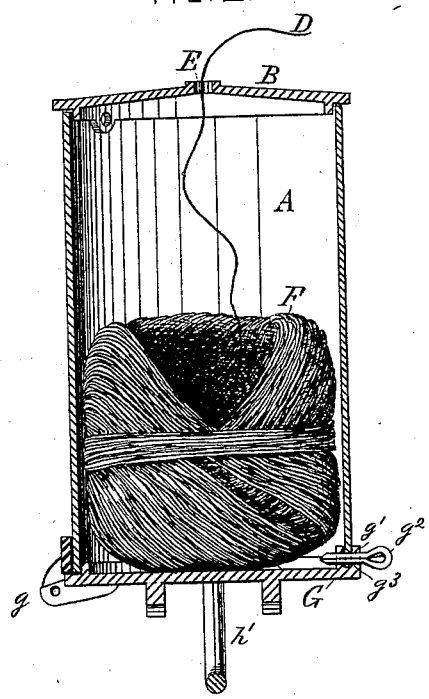
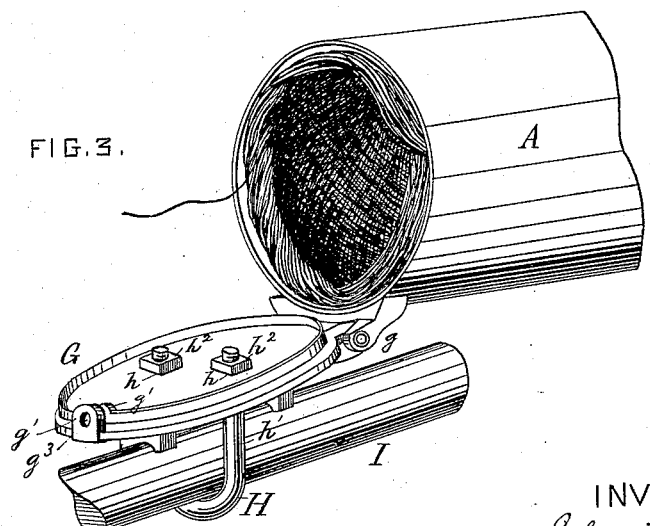
WITNESSES
Wm. A. Lowe
R. C. Howes
INVENTOR
John F. Appleby
Per Edw. E. Quimby
Atty.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

TWINE-BOX FOR GRAIN-BINDERS.

SPECIFICATION forming part of Letters Patent No. 290,658, dated December 25, 1883.

Application filed August 14, 1883. (No model.)

*To all whom it may concern:*

Be it known that I, JOHN F. APPLEBY, of Minneapolis, Minnesota, have invented a certain Improvement in Twine-Boxes for Grain-Binders, of which the following is a specification.

The twine-boxes used on grain-binders are usually made large enough to contain two balls of the twine or cord used for binding grain. These balls are superposed—the inner end of the lower ball is tied to the outer end of the upper ball, and the inner end of the upper ball is led through an aperture in the top of the box to the binding mechanism. Occasion frequently arises for introducing a fresh ball of twine before the lower ball is all used. At present, this is done by opening the cover of the box and lifting out the nearly exhausted ball and putting in the new ball, and replacing the nearly exhausted ball upon the top of it. In doing this there is danger of entangling the twine of the nearly exhausted ball.

It is the object of my invention to provide for the introduction into the twine-box of a fresh ball of twine without the removal therefrom of the partially exhausted ball which may have been previously contained therein. I accomplish this result by providing the cylindrical box which contains the twine with a hinged cover at the bottom or end opposite that from which the twine is led to the binding mechanism, so that when occasion arises for introducing a fresh ball of twine the cylinder may be opened at the bottom, and thus access may be had to the interior of the box for the purpose of tying the outer end of the nearly exhausted ball of twine to the inner end of the new ball, and then introducing the new ball of twine into the box at the bottom, and in so doing pushing the nearly exhausted ball toward the top of the box without removing it therefrom.

The accompanying drawings, illustrating a twine-box for grain-binders embodying my invention, are as follows:

Figure 1 is an elevation of the box, showing one of the horizontal members of the frame of a grain-binder upon which the box is supported. Fig. 2 is a central longitudinal section of the box, showing a partly used ball of twine in it. Fig. 3 is an isometrical perspective, showing the manner in which the box is tilted over preparatory to introducing a fresh ball of twine into it.

The drawings represent a twine-box, the body A of which is of the usual cylindrical form. The head B of the cylinder at the top may be either hinged to the cylinder in the usual manner or may be permanently affixed thereto. In either case it is provided with the usual friction device, C, for regulating the tension upon the binding-cord D, which is led from the interior of the cylinder through an aperture, E, in the head B. The two balls of twine which the box is capable of holding are superposed—the inner end of the upper ball is led through the aperture E in the head B, and the outer end of the upper ball is tied in the usual manner to the inner end of the lower ball.

In Fig. 2 the box is represented as containing only a portion of a single ball of twine, F, the upper ball and the larger portion of the lower ball being supposed to be exhausted. The lower head or bottom, G, of the box is connected with the cylinder A by the hinge $g$, and is provided with the lips $g'$, which are transversely perforated to receive the split pin $g^2$, which is also inserted through the hole $g^3$ in the wall of the cylinder, for the purpose of confining the head G to the cylinder, when it is desired to close the bottom. The head G or bottom of the cylinder is provided with two perforations, $h\ h$, to receive the two legs $h'\ h'$ of the U-shaped clamp H, which embraces the bar I, the latter being a portion of the frame of the grain-binder to which the twine-box is applied. The inner ends of the legs $h\ h$ are provided with screw-threads, to receive the clamping-nuts $h^2\ h^2$, by means of which the head G is securely clamped to the bar I, as shown. It will be understood, of course, that by tightening the nuts $h^2\ h^2$ the head G may be immovably clamped to the bar I in any desired position.

When the necessity arises for introducing a fresh ball of twine into the twine-box, the split pin $g^2$ is pulled out, and the cylinder A is then rocked over upon the axis afforded by the hinge $g$, thus opening the box at the bottom and affording opportunity for putting the fresh ball of twine into the lower end of the cylinder, and pushing the ball or part of the ball of twine which may have been previously in the box toward the head or top of the box. By this mode of construction facility is afforded for introducing a fresh ball of twine into the twine-box, without the necessity of removing therefrom the ball or portion of a ball which may have previously contained therein.

I claim as my invention—

1. A twine-box for a grain-binder, having a hinged cover at the bottom or end opposite that from which the twine is led to the binding mechanism.

2. The head G, clamped or otherwise secured to any convenient part of the grain-binder, and having a hinged connection with the bottom of the twine-cylinder A, provided with the perforated head B, as and for the purposes set forth.

JOHN F. APPLEBY.

Witnesses:
E. B. GUMPERT,
C. M. CASTLE.